United States Patent [19]
Mallaney et al.

[11] Patent Number: 4,736,576
[45] Date of Patent: Apr. 12, 1988

[54] HIGH EFFICIENCY LAWN MOWER HOUSING

[75] Inventors: Brian T. Mallaney, Rock Hill; Frank R. Allen; J. Jiri Olmr, both of Columbia, all of S.C.

[73] Assignee: Textron Inc, Providence, R.I.

[21] Appl. No.: 907,351

[22] Filed: Sep. 15, 1986

[51] Int. Cl.⁴ .................. A01D 34/67; A01D 34/72
[52] U.S. Cl. ............................... 56/255; 56/13.4; 56/320.2
[58] Field of Search ............... 56/13.4, 320.1, 320.2, 56/255

[56] References Cited

U.S. PATENT DOCUMENTS

| | | |
|---|---|---|
| 2,791,082 | 5/1957 | McDonough et al. ............ 56/13.4 |
| 2,957,295 | 10/1960 | Brown ............................... 56/295 |
| 2,983,096 | 5/1961 | Phelps ............................. 56/320.2 |
| 3,078,573 | 2/1963 | Kern ................................. 56/295 |
| 3,080,697 | 3/1963 | Mauro .............................. 56/295 |
| 3,192,692 | 7/1965 | Slemmons ......................... 56/13.4 |
| 3,398,514 | 8/1968 | Nolan .............................. 56/320.2 |
| 3,601,960 | 8/1971 | Buechler ......................... 56/320.2 |
| 3,706,189 | 12/1972 | Rutherford ..................... 56/320.2 |
| 3,874,149 | 4/1975 | Seifert et al. ................... 56/320.2 |
| 4,559,769 | 12/1985 | Seyerle ............................ 56/13.4 |

*Primary Examiner*—Paul J. Hirsch
*Attorney, Agent, or Firm*—Abraham Ogman

[57] ABSTRACT

A lawn mower is described having a high collection efficiency. This is accomplished by constructing a housing having a toroidally-shaped skirt defining the interior space in which the blade rotates in a horizontal plane. The interior space has a generally circular cross-section, the radius of which gradually increases toward a region of maximum radius between upper and lower portions of the housings. The blade is positioned to rotate in the lower portion of the housing and a discharge port is positioned to encompass the region of maximum radius.

8 Claims, 2 Drawing Sheets

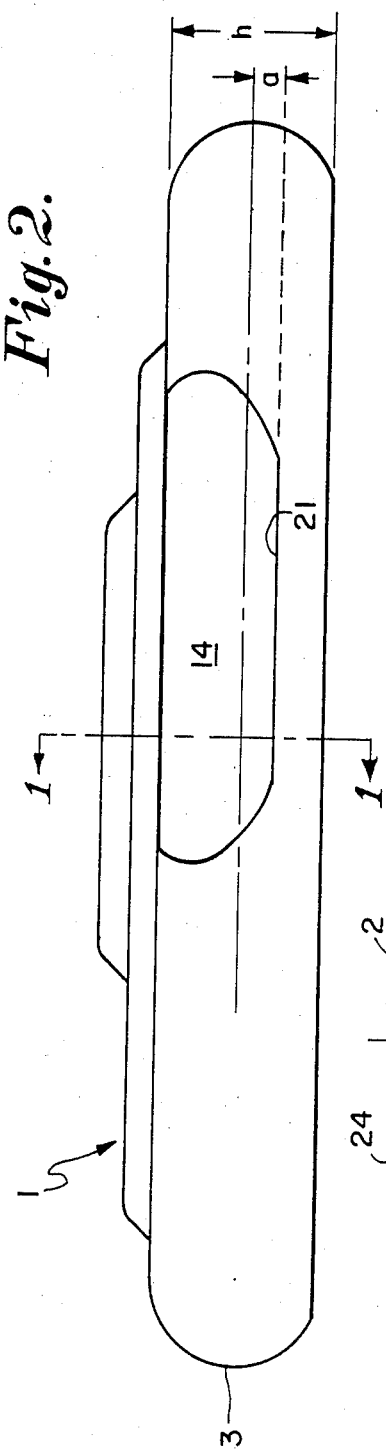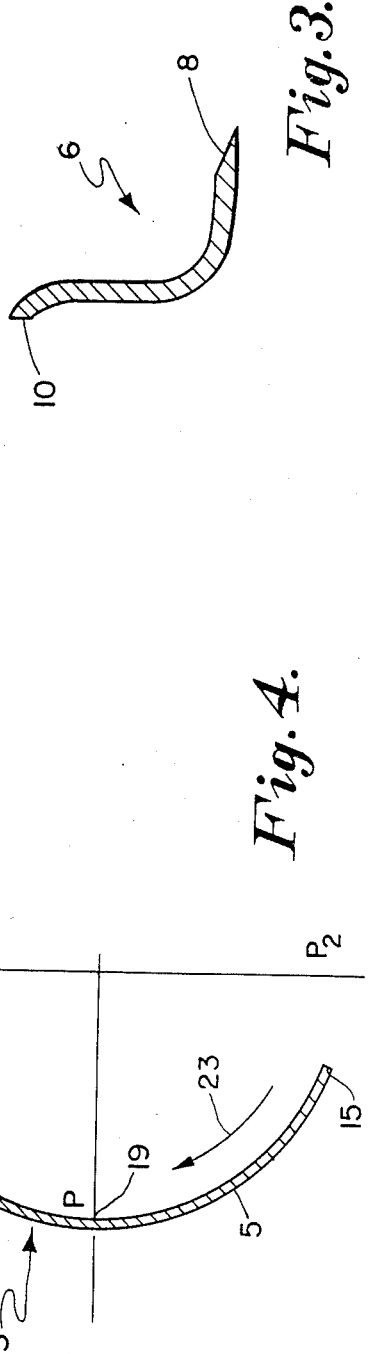

HIGH EFFICIENCY LAWN MOWER HOUSING

BACKGROUND OF THE INVENTION

Lawn mowers of the general type involved in this invention have been available for many years. They employ a housing on which is mounted a gasoline or electric motor. The motor provides power through a rotating shaft to a blade which rotates within the housing in a plane generally parallel to the ground. Grass that is cut is forced both by mechanical impingement and by centrifugal force vertically upward or radially outward to a discharge port in the housing.

Lawn mowers of the prior art have consistently had several problems. Grass cuttings tend to fall back through the blade and avoid collection. Moist cuttings accumulate and clog the housing. Grass cuttings clog the discharge port thereby aggravating these problems.

The prior art has attempted to provide solutions to these problems by designing cutting systems which employ specially constructed housings and associated blades. Typical attempts are shown in U.S. Pat. Nos. 3,192,692; 3,601,960 and 4,158,279 which describe a variety of housing shapes and blade configurations.

U.S. Pat. No. 3,192,692, which issued to Slemmons, shows a semi-toroidal housing situated above the blade to provide a space to collect and discharge grass clippings through a discharge port located in the upper portion of the housing. A very specific blade construction is required to provide efficient collection and discharge of the grass.

U.S. Pat. No. 3,601,960, which issued to Buechler, describes a volute-shaped housing having a side discharge chute. A disc-shaped lower lip defines the access opening to the blades. A passage is provided radially outward from the tip of the blade. This passage increases in size as the volute expands in radius towards the discharge chute. Again a blade is constructed with unique features to enhance the collection and discharge characteristics of the housing.

U.S. Pat. No. 4,158,279, which issued to Jackson, describes a cylindrical housing having a radial extending lower lip similar to Buechler. An enlarged area is provided over the plane of the blades to collect the clippings as in Slemmons. Here, as in the earlier patents, a special blade configuration is used which requires the bolting of enlarged impellers to the tips of the blades opposite to the cutting edge to mechanically increase the upward movement of the grass clippings.

The functioning of the cutting systems of the prior art is mainly dependent on the centrifugal forces of the radially flowing air created within the housing by the rotating blade.

In the Buechler patent several steps are taken to enhance the centrifugal flow. The first is the construction of gutters in the upper blade surface to maintain the grass clippings on this upper surface where they will be directed radially outward. Additionally, vents are provided in the upper housing which, in association with impellers, create secondary airstreams to suppress the grass clippings towards the blade. The overall result in combination with the extended lower wall and lip is to provide an enhancement of the centrifugal effect to improve the efficiency of discharge through the volute-shaped side discharge port.

Since the art has moved from the side discharge system of the Buechler patent to the rearward discharge similar to the Slemmons patent and the Jackson patent, centrifugal force is insufficient to provide efficient collection and discharge. An upward motion now must be imparted to the grass clippings in order to discharge from above the blade instead of radially outward at the tip of the blade. This problem was attacked in general by the use of blade shapes which provide, through mechanical impingement, an upward motion to the grass clippings as in the Slemmons and Jackson patents. The use of special blade designs increases the complexity and expense of the blade.

It is the object of this invention to provide greatly improved collection efficiency while utilizing a standard blade common in the industry.

It is also the object of this invention to enhance the beneficial effects of the centrifugal airflow through the use of a unique housing design which is simple to manufacture.

It is another object of this invention to minimize the blade requirements and avoid the need for complex shapes or the need for close tolerances between the blade and housing.

SUMMARY OF THE INVENTION

A housing for a lawn mower is constructed having a generally circular horizontal cross-section into which is mounted a standard blade for rotation about the vertical axis of the housing. The housing consists of a flat upper deck portion terminating in a downward extending, toroidal skirt surrounding the tips of the rotating blade. The shape of the skirt may be approximated by the rotation of an arcuate segment of approximately 150° about a vertical axis. The tip of the blade extends radially within the housing into the volume formed by the lower portion of the arcuate segment.

A discharge port is formed mainly in the upper portion of the arcuate segment but extends downward also into the lower portion of the housing.

DESCRIPTION OF THE DRAWING

The invention is described in more detail below with reference to the drawing in which:

FIG. 2 is a side view of the housing of this invention;

FIG. 3 is a cross-section of the blade taken along section lines 2—2 in FIG. 1 showing the shape of the blade; and FIG. 4 is a cross sectional view of the skirt 3 showing the pressure gradient within the housing of this invention.

DETAILED DESCRIPTION OF THE PREFERRED EMBODIMENT

Figure 1:
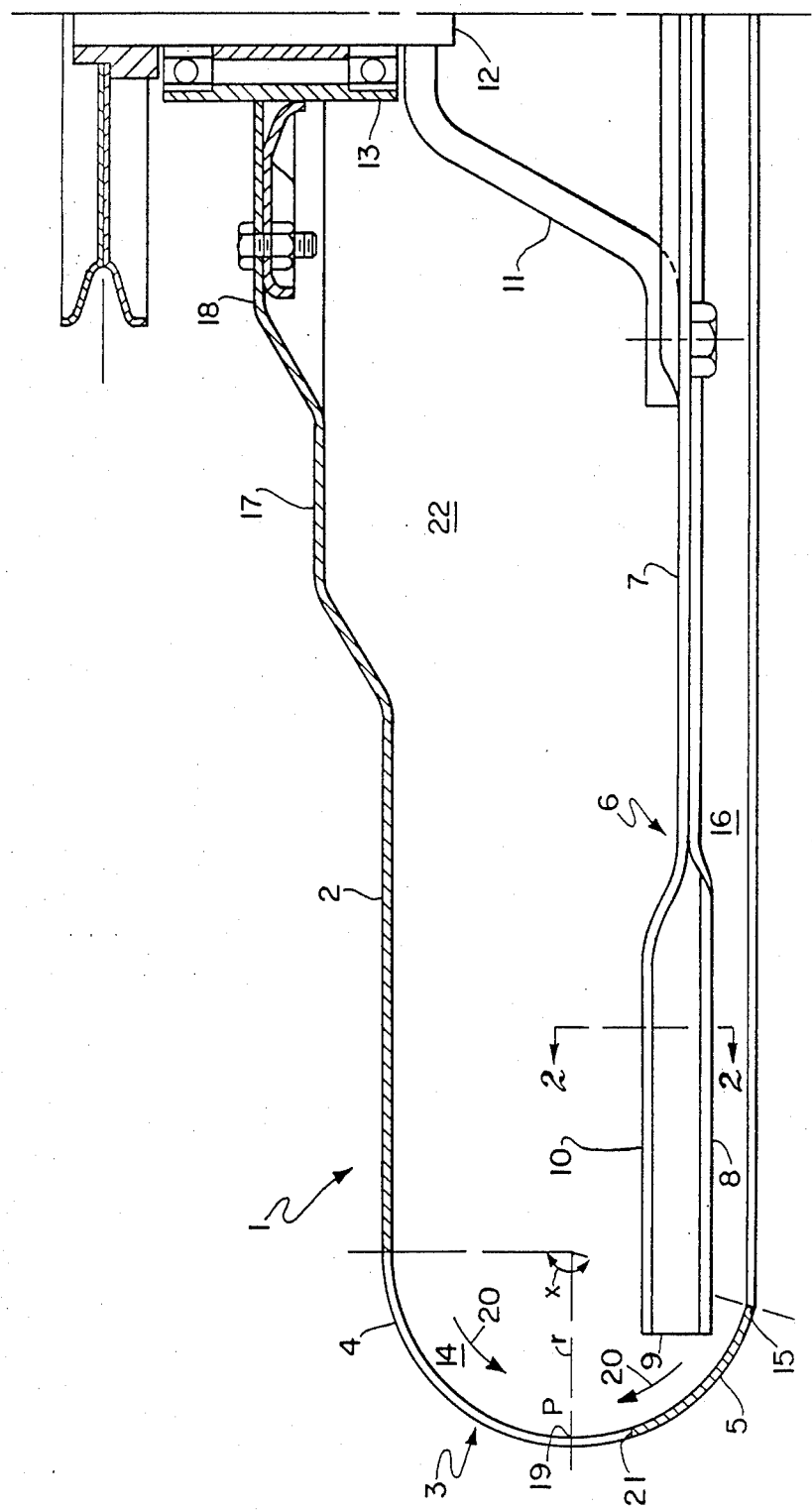
FIG. 1 is a sectional view of the housing taken along section lines 1—1 in FIG. 2 showing the relationship of the blade within.

One configuration of the housing 1 of this invention is shown in FIGS. 1 and 2 and is constructed having an upper deck 2 which extends radially outward to form a disc-shaped platform. An engine or motor (not shown) will be mounted to deck 2 to provide power to drive shaft 12. A skirt 3 is integrally formed with and extends downward from the deck 2. The skirt 3 is shown in FIG. 2 and is shaped in a toroidal form which can be approximated by the rotation of an arcuate segment of about 150° about the vertical center axis of the housing. The skirt 3 is defined by an angle (x) and has a radius (r) and height (h). The angle (x) may be constructed in the range of 150° to 180°. For the purpose of explaining the operation of the system, the cross-section of skirt 3 can be visualized as separated into upper portion 4 and lower portion 5. The upper portion 4 terminates in a tangent 24 to the horizontal deck 2 to form a smooth transition therewith and to provide a flat upper surface. The lower portion terminates in an inward extending edge section 15 which is inclined from the horizontal to define the access opening 16. The housing 1 can then be observed to define an interior space 22 consisting of upper and lower portions defined by the portions 4 and 5 of skirt 3.

A blade member 6 is mounted by means of support bracket 11 to shaft 12. Shaft 12 is mounted for rotation in bearing sleeve 13 which is fixed to housing 1. Blade member 6 is constructed having a radially extending support arm 7 integrally formed with cutting edge 8 and upturned trailing edge 10. Blade member 6 terminates in tip 9.

The blade member 6 is positioned within housing 1 so that tip 9 extends into the lower portion 5 of skirt 3. In this manner, the blade 6 rotates in a plane within the lower portion of interior space 22. The arcuate segment of skirt 3 terminates in an edge 15 which extends inward under blade tip 9 to define the bottom opening 16 of the housing 1. The blade 6 may be shaped in any conventional simple form as shown in FIG. 3. Although in some configurations a high lift blade may provide benefits, no appreciable lift is necessary, and although it is important that the blade be positioned within the lower portion 5 of the skirt 3, its relative position within the lower portion and its relationship with edge 15 is not critical.

Discharge port 14 is constructed as shown in FIG. 2 and is mostly located within the upper portion 4, but extends downward into portion 5 to include the region of maximum radius around point 19. Since, as discussed below, the grass cuttings accumulate in the general region indicated at (P) because of the resulting lower pressure, the discharge port 14 must extend into this area a distance (a). If we consider a housing 1 having a height (h) of four and a half inches, the distance (a) to the lowest portion of the discharge port 14 would be approximately one inch.

The upper deck 2 may be of a variety of shapes as long as a rigid mounting surface is provided for the drive motor. By providing the raised platforms 17 and 18, the strength of the deck is increased and wells for the collection of debris and fluids are avoided.

Structurally, it is important that housing 1 be constructed with a generally circular horizontal cross-section. The radius of this cross-section will gradually increase as one moves downward in portion 4 and upward in portion 5 to the point 19 of skirt 3. The transition, therefore, between the lower and upper portions of housing 1 is the region of maximum radius. The blade is positioned so that its plane of rotation is below the region of maximum radius and the discharge port 14 extends downward into said region.

OPERATION OF THE INVENTION

As can best be seen in FIG. 2, by constructing skirt 3 in the general shape of a toroid, the horizontal cross-section of housing 1 has a continuously changing radius which reaches a maximum approximately midway in its height (h) and decreases symmetrically in the upper and lower portions.

The velocity of the air will be greatest therefore near the tip 9 of the blade 6 where the radius of the housing is at a maximum. This variation in rotational speed of the airflow will cause a negative pressure gradient in the upper and lower portions as shown in FIG. 4 with the lowest pressure (P) in the vicinity of the point 19 of the skirt 3. The pressures ($P_1$) and ($P_2$) are greater than (P) and a negative gradient exists as shown in FIG. 4 by the arrows 23. This pressure gradient creates an airflow, as shown by arrows 20 in FIG. 1, generally towards point 19 from both above and below. In fact, a significant airflow upwards at edge 15 is created by this negative pressure gradient. Since the airflow at the tip 9 of blade 6 tends to move radially outward it impinges on an upwardly inclined surface of skirt 3 and an upward motion is reinforced in this area. A marked increase in suction is therefore provided.

The improved results brought about by the unique design of this invention are startling in that improvements in collection efficiency of 200 to 300 percent over prior art cutting systems have been obtained. Because of the low pressure area achieved in the vicinity of point 19, a very defined discharge region is achieved. The discharge port 14 is therefore constructed as shown in FIG. 2, within the upper portion 4 with its lower border 21 extending downward past point 19 into lower portion 5.

Although other shapes may be used to create the region of lower pressure (P) in the vicinity of point 19 and the resultant flow of air described above, the toroidal shape illustrated is believed the easiest to construct. By providing a region of maximum radius, the low pressure region may be localized and advantage can be taken of the pressure gradient which is created. By additionally providing an upward inclined surface at the tip of the blade, this flow is strengthened and the overall suction of the mower can be enhanced. Since the region of collection is localized, the discharge port 14 can be strategically located for maximum convenience anywhere on the periphery of housing 1.

The shape of the housing 1 allows it to be manufactured by stamping or pressing in one piece rather than the more expensive process of spinning. Many of the prior art systems require an assembly of parts which are welded to form the housing thereby increasing the manufacturing cost. The housing of this invention also provides a smooth inner surface which eliminates troublesome dead spots where grass cuttings can collect. The smooth exterior housing provides glancing engagement with obstacles and minimizes damage.

We claim:

1. A lawn mower having a housing defining a generally annular interior space; a motor mounted on the housing to provide rotational motion to a drive shaft; and a cutting blade mounted within the interior space of the housing for rotation with the drive shaft in a generally horizontal plane wherein the housing comprises:
    a circular disc-shaped, horizontally oriented, upper deck constructed with means to which the motor may be mounted; and
    skirt means extending downward from the deck and circumferentially about the deck, having a uniformly configured cross-section along its circumferental length, said skirt being constructed with a vertical cross-section having upper and lower portions, said upper portion being inclined downward and outward forming horizontal cross-sections of gradually increasing radii, the lower portion being inclined downward and inward terminating in an inwardly extending edge section which is also inclined from the horizontal and thereby forming horizontal cross-sections of gradually decreasing radii said upper and lower portions of the skirt means being contoured for creating, in conjunction with the rotary motion of the blade, a region of lower pressure adjacent to the skirt intermediate said portions, said lower pressure tending to draw airflow downward in the space defined by the upper portion of said skirt and upward in the space defined by the lower portion of said skirt;

said blade being mounted within the housing for rotation on the drive shaft in a plane situated in the space defined by the lower portion of the skirt; and a discharge port defined in the skirt to enable cut material to be expelled from the housing.

2. A lawn mower as described in claim 1 wherein the lower portion of the skirt is also contoured to direct radial airflow from the blade upward to reinforce the upward motion of the airflow in said lower portion.

3. A lawn mower as described in claim 1 wherein the discharge port is positioned in the housing to communicate with said region of lower pressure.

4. A lawn mower having a housing defining a generally annular interior space; a motor mounted on the housing to provide rotational motion to a drive shaft; and a cutting blade mounted within the interior space of the housing for rotation with the drive shaft in a generally horizontal plane wherein the housing comprises:

a circular disc-shaped, horizontally oriented, upper deck constructed with means to which the motor may be mounted;

arcuate skirt means extending downward from the deck having upper and lower portions, said skirt defining the interior space of the housing which has generally circular horizontal cross-sections, the radii of said horizontal cross-sections gradually increasing downward in the space defined by said upper portion of the skirt and gradually increasing upward in the space defined by said lower portion of the skirt from an edge section which is inclined from the horizontal said edge section also delineating an access opening into the housing and the transition between upper and lower skirt portions being at a region of maximum radius;

said blade being mounted within the housing for rotation on the drive shaft in a plane situated in the space defined by the lower portion of the skirt; and a discharge port defined in the skirt to enable cut material to be expelled.

5. A lawn mower as described in claim 4 wherein the discharge port circumscribes an area of the housing which includes the region of maximum radius.

6. A lawn mower as described in claims 2 or 1 wherein the skirt is constructed with a generally arcuate vertical cross-section.

7. A lawn mower as described in claim 4 wherein the upper deck joins the skirt along a tangent to the generally arcuate vertical cross-section.

8. A lawn mower as defined in claim 4 where the arcuate section is an arc of a semicircle.

* * * * *